(No Model.)
R. D. THACKSTON.
SELF CLOSING HATCHWAY.
No. 386,366. Patented July 17, 1888.
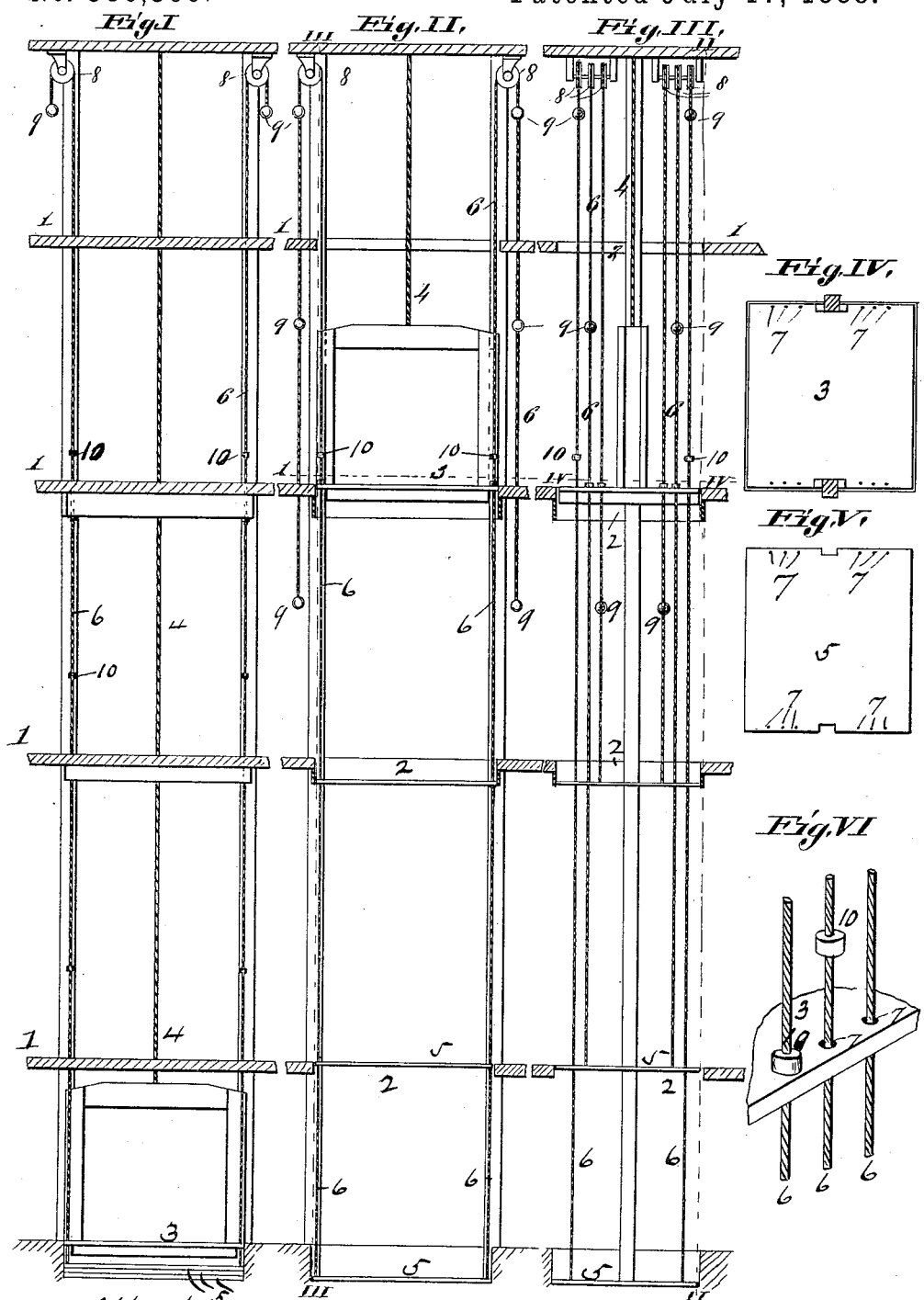
Attest:
W. E. Knight.
E. Arthur.
Inventor,
Richard D. Thackston.
By Knight Bros.
attys.

UNITED STATES PATENT OFFICE.

RICHARD D. THACKSTON, OF ST. LOUIS, MISSOURI, ASSIGNOR TO THE SAFETY HATCH-DOOR COMPANY, OF SAME PLACE.

SELF-CLOSING HATCHWAY.

SPECIFICATION forming part of Letters Patent No. 386,366, dated July 17, 1888.

Application filed October 26, 1887. Serial No. 253,455. (No model.)

*To all whom it may concern:*

Be it known that I, RICHARD D. THACKSTON, of the city of St. Louis, in the State of Missouri, have invented a certain new and useful Improvement in Self-Closing Hatchways, of which the following is a full, clear, and exact description, reference being had to the accompanying drawings, forming part of this specification, and in which—

Figure I is a vertical section through a building, showing in elevation an elevator and several hatchways, the elevator being shown at the bottom of the building. Fig. II is a similar view showing the elevator near the top of the building. Fig. III is a section taken on line III III, Fig. II. Fig. IV is a transverse section taken on line IV IV, Fig. II. Fig. V is a view of one of the doors. Fig. VI is an enlarged detail perspective view showing part of one of the doors, showing three ropes or cables and two of the stops.

My present invention relates to an improvement on the patent issued to myself and Henry I. Coe, as assignee, October 13, 1885, No. 328,362, and my present invention relates to the manner of closing the hatchways beneath the cage as the latter ascends and descends.

My present invention consists in features of novelty hereinafter fully described, and pointed out in the claims.

Referring to the drawings, 1 represents the floors of a building, and 2 the hatchways therein.

3 represents the cage, and 4 the hoisting-cable.

5 represents doors for closing the hatchways beneath the cage as the latter ascends. Each of these doors is provided with carrying-ropes 6. I prefer to use four sets of these ropes to each door, (two sets at each end, as shown in Fig. V.) The doors above that to which any one set of ropes is secured would be provided with holes 7 for the passage of said ropes. All of the ropes extend to or nearly to the top of the elevator-shaft, and there pass around pulleys or sheaves 8 and extend downward from the pulleys or sheaves, and have secured to their free ends weights or counter-balances 9. Each set of ropes is provided with stop-blocks or projections 10, against which the cage comes in ascending and stops the passage of the ropes through the openings 7, or, in other words, stops the cage from moving upward without carrying the ropes on which the blocks are secured with it. As soon as the cage comes against the blocks of any one set of ropes, the door of that set of ropes is lifted or raised. The counter-balances are provided so that the cage is only required to lift a very small portion of the weight of the doors. When the cage is at the bottom of the elevator-shaft, the doors 5 are stacked beneath it, as shown in Fig. I. Then, as the cage ascends and comes against the projections on the cords or ropes 6 of the top door, (shown in Fig. VI,) this door is lifted to close the first hatch beneath the cage, the hatch at the cage being closed by the cage. Then, as the cage continues to ascend, the said door is raised up, closing the next hatch, and the second door (shown in Fig. VI) is raised by the cage coming against the blocks of its ropes to close the hatchway immediately beneath the first door, and so on any desired number of hatchways may be closed. When the cage descends, the doors are carried back again into the position shown in Fig. I, and the hatchways may, if desired, be closed on the descent of the cage by doors that will be carried up as the cage ascends and deposited as the cage descends—as, for instance, in the patent referred to; but this closing of the hatchways above the cage forms no part of my present invention, and therefore I have not shown any means in this application for accomplishing this.

I claim as my invention—

1. In combination with an elevator-shaft, pulleys or sheaves at the top thereof, ropes passing over said pulleys, doors each attached to the lower end of independent ropes, blocks or projections on the ropes, and a cage adapted to contact with and lift the blocks successively as the cage rises, and with them the independent ropes and doors, substantially as and for the purpose set forth.

2. In combination with an elevator-shaft, pulleys or sheaves at the top thereof, ropes passing over said pulleys or sheaves and weighted at their upper ends, doors each attached to the lower ends of independent ropes, blocks or projections on the ropes, and a cage adapted to contact with and lift the blocks successively as the cage rises, and with them the independent ropes and doors, substantially as and for the purpose set forth.

RICHARD D. THACKSTON.

In presence of—
GEO. H. KNIGHT,
JOS. WAHLE.